United States Patent Office 2,703,678
Patented Mar. 8, 1955

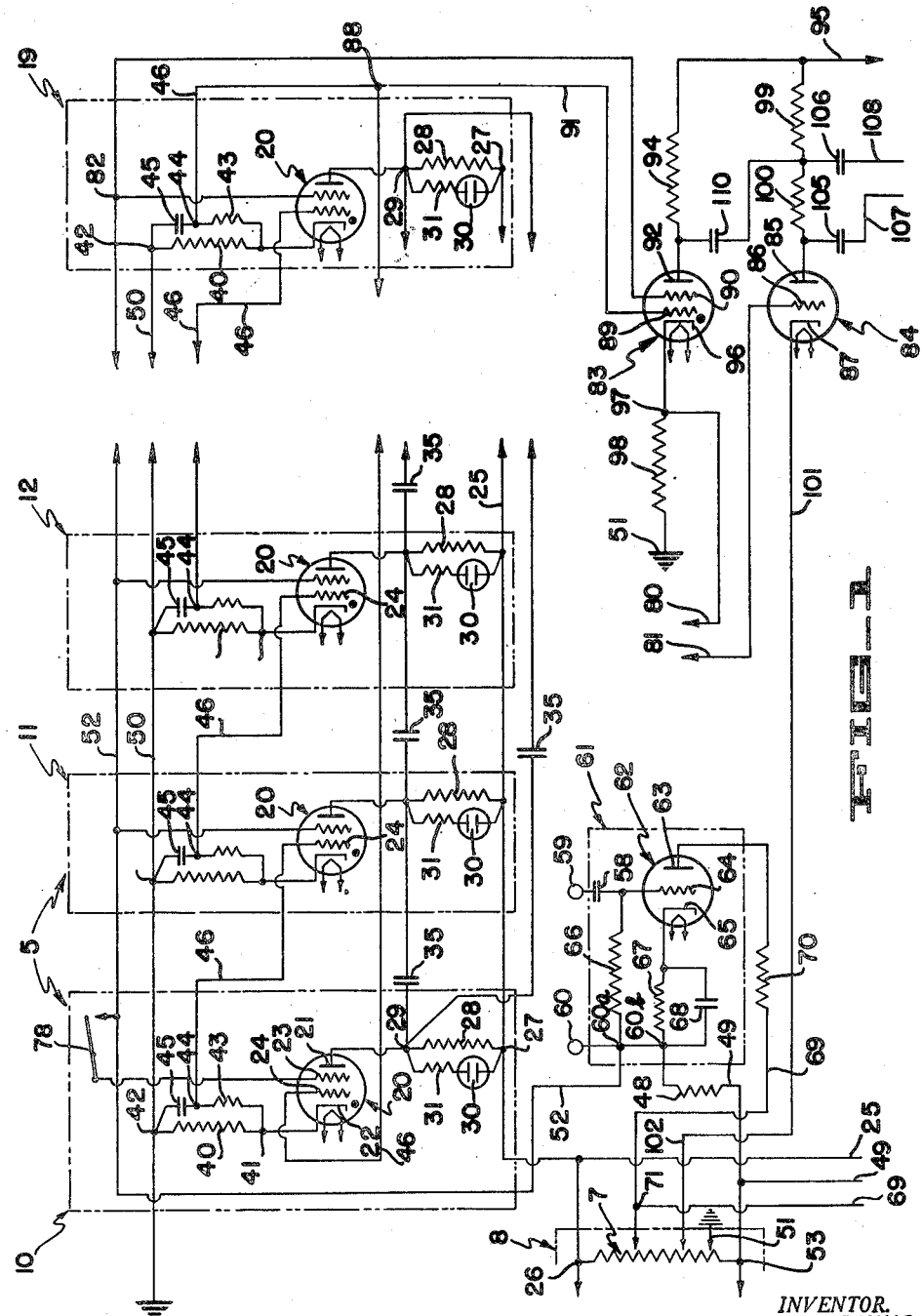

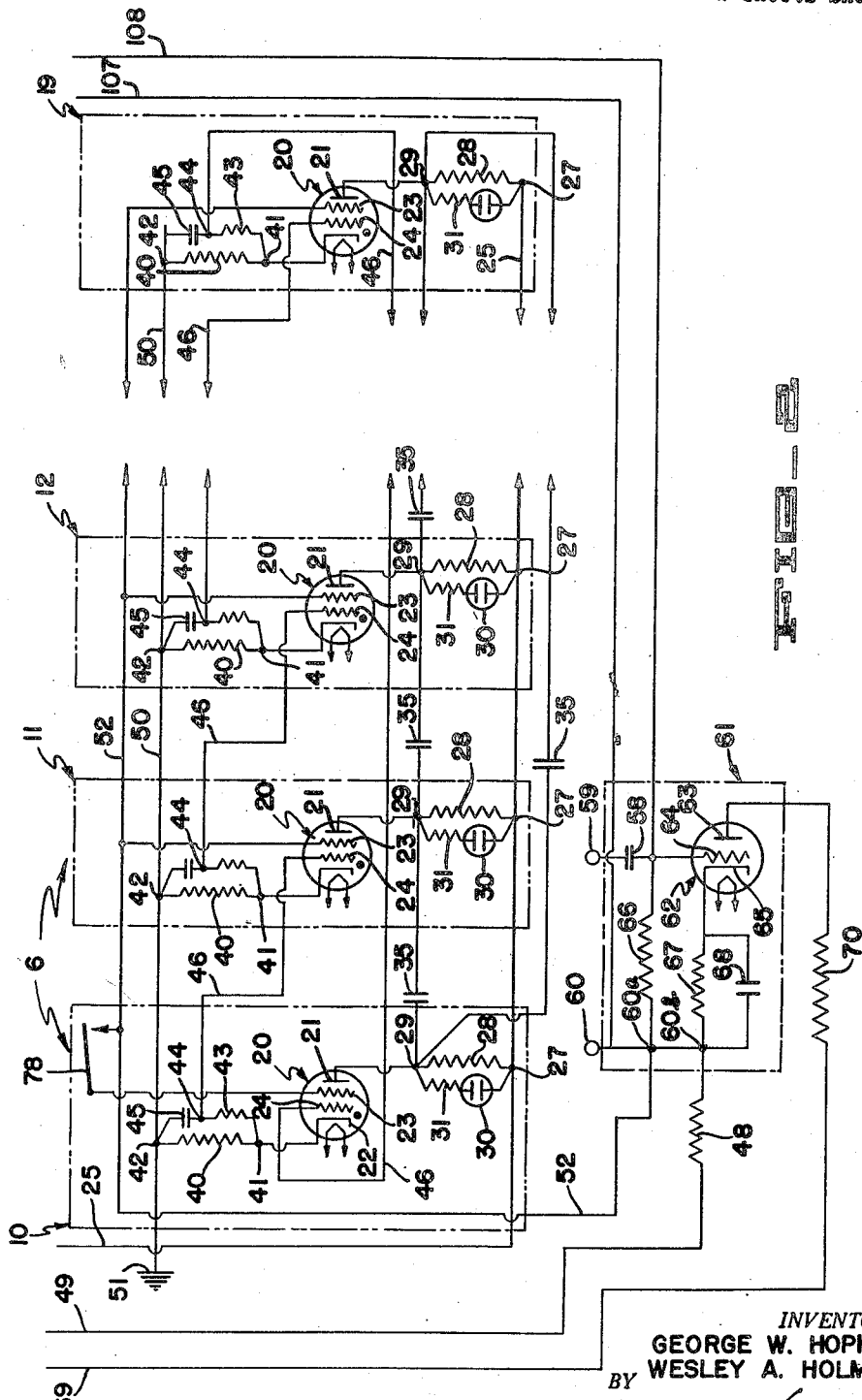

2,703,678

ELECTRONIC COUNTER

George W. Hopkins, San Leandro, Calif., and Wesley A. Holman, Phoenix, Ariz., assignors to Friden Calculating Machine Co., Inc., a corporation of California Application December 26, 1950, Serial No. 202,796

6 Claims. (Cl. 235—92)

This invention relates to improvements in electronic impulse and counting devices, and more particularly to an electronic tens-transfer circuit therefor.

In the construction and operation of electronic counting devices, considerable circuit simplification and a reduction in the number of components required can be achieved by providing an electronic transfer circuit which will automatically carry a "1" in the next higher ordinal bank whenever the indicating circuit of the next lower ordinal bank passes from 9–0, thereby providing an electronic counting device which is more compact, more readily portable, and more reliable in operation.

It is an important object of the present invention, therefore, to provide a multiple bank electronic counting device which is adapted to be operated by a timed transfer impulse for making a carry of "1" to the next higher ordinal bank whenever the value indicating circuit in a bank passes from 9–0.

It is also an object of the invention to provide electronically controlled means for transferring a single transfer pulse from a lower order bank of counting tubes to a higher order bank of counting tubes whenever the lower order bank passes through its predetermined transfer position.

It is another object of the invention to provide electronically controlled means for transferring a single timed transfer pulse from an order bank of ordinally arranged counting tubes whenever the order bank passes through its predetermined transfer position, thereby providing a transfer means which can be readily adapted to any type of electronic counting device, such as a binary, octal, or decade counter.

It is also an object of the invention to provide an electronic transfer means for a multiple bank electronic counting device, the said transfer means including an electronic control circuit adapted to take and effectively store a transfer impulse as an ordinal bank passes through its predetermined transfer position.

Further objects are to provide a construction of maximum simplicity, economy, and ease of assembly and disassembly, also such further objects, advantages and capabilities as will fully appear and as are inherently possessed by the device and the invention described herein.

The invention further resides in the combination, construction, and arrangement of parts illustrated in the accompanying drawings, and while there is shown therein a preferred embodiment thereof it is to be understood that the same is illustrative of the invention, and that the invention is capable of modification and change and comprehends other details of construction without departing from the spirit thereof, or the scope of the appended claims.

Referring to the drawings:

Fig. 1 is a schematic circuit diagram of the units order bank of counting tubes for an electronic decade counter, showing the units order value pulsing crcuit and the electronic circuit for supplying transfer pulses to the tens order bank of counting tubes illustrated in Fig. 2.

Fig. 2 is a continuation of the schematic circuit diagram illustrated in Fig. 1, showing the tens order bank of decade counting tubes and the pulsing means associated therewith.

Referring now to the drawings, there is shown generally at 5 and 6 the respective units and tens order, rings, or banks, of a decade electronic counter, each such bank being supplied with suitable operating voltages obtained from the voltage divider 7 of a direct current power supply 8. A similar electronic counter ring or bank is provided for the hundreds order and for each higher order of the machine, and each such counter bank preferably is composed of ten identical stages of which the first, or zero value, stage 10 is typical, the second stage 11 in each such bank representing the value "1," the third stage 12 representing the value "2," and so on until the last stage 19 is reached which represents the value "9." It will be observed that the individual value indicating tubes in each ordinal bank have their anodes connected in common, screen grids connected in common, and cathodes connected in common, while each control grid thereof is connected to the cathode of the preceding tube in a cascade circuit arrangement. As each such stage becomes conducting, it conditions the next stage in the series for operation. Since the operation of the stages within each ordinal bank is that of a progressive series, the counter tube banks will be hereinafter referred to as cascade operated, even though certain components thereof are connected by common conductors. Although a decade counter has been illustrated in the drawings, it will be apparent to those skilled in the art that an octal counter may readily be provided by deleting the "8" and "9" value tubes in each ordinal bank, and that the circuit arrangement described herein may be easily adapted to the binary or any other desired numerical system by changing the number of individual value tubes in the ordinal banks.

The first or "0" value stage 10 will now be described in detail, it being understood that stage 10 is typical of all value stages in each ordinal bank. Stage 10 includes a gaseous discharge tube 20, such as a tetrode of the thyratron type commonly known as 2050, which tube includes an anode 21, a cathode 22, a screen grid 23, and a control grid 24. It will be observed that plate potential is supplied to anode 21 by a common line 25 having one end connected to a point 26 of high positive potential on the voltage divider 7 (Fig. 1), the other end of line 25 being connec..ed to one terminal 27 of a voltage drop resistor 28 having its other terminal 29 connected to the anode 21. A neon glow or indicating tube 30 and a current limiting resistor 31 are connected in series across the resistor terminals 27, 29 in such a manner as to visually indicate what the position is of the associated gaseous discharge tube 20 and its conducting circuit, conducting or non-conducting.

Connected between the anode terminal 29 in stage 10 and a corresponding anode terminal 29 in stage 11 is a commutating capacitor 35, which terminal 29 represents the common junction of the voltage drop resistor 28, the current limiting resistor 31, and the tube anode 21. Identical commutating capacitors 35 similarly connect adjacent anode terminals 29 of the remaining stages in the bank, the anode terminal 29 for the last such stage 19 being connected to the anode terminal 29 for the first such stage 10 by a commutating capacitor 35. These commutating capacitors are operable to prevent more than one gaseous discharge tube 20 from conducting at a time, as will be hereinafter more fully described.

Connected in series with the cathode 22 of each tube 20 is a bias resistor 40 having end terminals 41 and 42. Terminal 41, which always has the same potential as the cathode 22 is connected through the series resistor 43 with a terminal 44 connected by the line 46 to a control grid 24 in the next stage of the series. A condenser 45 is also connected between the control grid terminal 44 and the other end 42 of the bias resistor 40. The time constant of the network formed by the combination of the resistor 43 and the condenser 45 is such as to delay for a predetermined period of time the application of a more positive or less negative voltage to the control grid 24 of the next stage in the tube bank. The common return line 50 connects the cathode resistor terminals 42 with ground, which line 50 has the same potential as the grounded terminal 51 on the voltage divider 7. Since line 25 connects the positive plate voltage connection 26 on the voltage divider with the anodes 21 of the various stages through the identical voltage drop resistors 28, it will be seen that the individual stages in each tube bank have their anodes 21 connected in common, as well as their cathodes 22. Through a resistor 48 and lead 49, counting bus line 52 connects the most negative voltage terminal 53 on the voltage divider with the screen grids 23 of the various stages, which negative voltage is normally sufficiently negative to bias the gaseous discharge tubes 20 to cutoff, thus rendering these tubes normally nonconducting.

For purposes of illustration, assume now that the tube 20 for the first or "0" value stage is made conducting by suitable means, as by opening and closing the switch 78. It will be readily apparent that the flow of current through the stage 10 cathode resistor 40 acts through the associated series resistor 43 to apply a positive bias to the control grid 24 of tube 20 in the next following stage 11 sufficient to condition this stage for conduction. Stage 11 cannot become conducting, however, until the instantaneous potential of its screen grid 23 has also been raised above the critical firing value. As long as the first stage tube 20 remains conducting, a voltage drop is produced across the associated anode resistor 28 sufficient to cause the associated neon indicating tube 30 to glow to indicate conduction in tube 20, during which time the potential of the first stage cathode 22 is above ground potential.

The commutating condenser 35 connecting the anode of the first stage 10 with the anode of the second stage 11 is operable when either of the stages 10 or 11 becomes conducting to terminate conduction in the other stage, thereby providing for alternate conduction of the first two stages in the following manner. While the first stage is conducting, for example, the voltage of the second stage anode is substantially that of the plate voltage terminal 26. The voltage of the first stage anode 21, however, is positive with respect to its cathode 22 only by the relatively small voltage drop across the conducting tube. As soon as the second stage 11 is made conducting by making the voltages on the screen and control grids 23, 24 less negative, or more positive, than the critical firing value, a large and sudden voltage drop is produced across the stage 11 anode resistor 28. This drop causes the second stage indicator tube 30 to glow in the manner previously described. The suddenness of the voltage drop on the anode of stage 11 causes the commutating condenser 35 between stages 10 and 11 to discharge. This stops conduction of the stage 10 tube long enough for its grids to obtain control. The voltage of the stage 10 anode 21 then increases to that of the positive plate supply terminal 26.

If the gaseous discharge tube in the third stage 12 is fired by simultaneously making its screen grid 23 and control grid 24 voltage less negative, or more positive, than the critical firing value, the commutating condenser 35 which connects the stage 11 anode with the stage 12 anode, operates in the same manner to extinguish conduction of the stage 11 gaseous discharge tube. The commutating condenser which connects the penultimate anode with the last stage anode 19 operates similarly to extinguish the penultimate tube as the last stage 19 is fired. In a similar manner, the commutating condenser 35 which connects the last stage anode with the terminal 29 of the first stage anode operates to extinguish conduction of the last stage 19 as the tube 20 in the first stage 10 is fired. As was mentioned earlier herein, the time constant of the network formed by the resistor 43 and condenser 45 associated with each stage is such as to delay the application of positive voltage to the control grid 24 for the tube in the next stage in the series until the pulsing, or lowering, of the signal voltage on the counting bus line 52 has been completed.

It will be evident that a positive pulse produced on line 52 and screen grids 23 by operation of the pulse receiving and amplifying stage 61, or by other suitable means, can only cause to conduct that particular tube 20 which has a positive bias simultaneously applied to its control grid 24. In the circuit arrangement shown in the drawings, positive bias is supplied by a conducting tube only to the tube following it, and the glowing action of one of the neon indicating tubes 30 indicates the position of its stage, conducting or nonconducting, and the positive accumulation of a series of pulses or counts. All that is required to operate the counter circuit in a reverse or negative direction is to provide suitable reversing switches, not shown, adapted to connect the control grid terminals 44 with the control grids for the preceding stages, instead of with the following stages as shown in Fig. 1. Hence, the number of counts applied to the input terminals 59, 60 of the pulse amplifier 61 in any given interval of time may be determined by noting which one of the neon lamps 30 in each bank glows to indicate that its associated gaseous discharge tube is conducting, while all other tubes 20 remain nonconducting.

Tens-transfer circuit

For purposes of illustration, the ten tube decade counting ring or bank 5 shown in Fig. 1 will be identified with the units order of the electronic counter, whereas the similarly constructed and arranged tube bank 6 shown in Fig. 2 will be identified with the tens order thereof, it being understood that additional decade tube rings or banks may readily be added to increase the numerical capacity of the counter circuit as desired. As has been previously described, each such tube bank is composed of a series of ten cascade-connected stages, the first such stage 10 representing the value "0," the second stage 11 representing the value "1," etc., in a progressive sequence until the last stage 19 is reached, which latter corresponds to a value of "9." The individual stages within each decade tube bank 5, 6 are so constructed and arranged that only one stage conducts at a time, as is indicated by its associated neon glow tube 30. As each such stage becomes conducting it automatically preconditions the next following stage in the same bank to become conducting as soon as the next count or impulse signal is received, at which time the last fired tube in the bank ceases to be conducting. Whenever the last stage 19 is reached and becomes conducting so as to indicate a value of "9," stage 19 preconditions the "0" value stage 10 for conduction, so that the next count or impulse signal causes the tube 20 in the first stage 10 to fire at substantially the same time as the stage 19 ceases to be conducting.

In order to perform calculations automatically with such an electronic counting circuit, it is desirable that counting impulses or signals be supplied simultaneously to both tube banks 5 and 6, and that means be provided to insure that the units bank 5 will transmit a single transfer pulse to the tens order bank 6 whenever stage 19 ceases to be conducting and stage 10 fires in the units order bank, thereby indicating a change in value from 9–0.

The digitation impulses or counts may be supplied to the input terminals 59, 60 of the digitation pulse amplifier 61 by any convenient means such as a mechanically actuated switch, an automatic dial system of the telephone type, or a magnetic drum of the type shown and described in George W. Hopkins Patent No. 2,608,346 issued August 26, 1952, the latter device also being adapted to provide staggered transfer impulses to the lines 80, 81 (Fig. 1) after digitation has ceased, which impulses may be readily utilized to operate the electronic transfer circuit of the instant invention. The digitation, or counting, pulses are applied to the input terminals 59, 60 of a conventional amplifier stage 61 (Figs. 1 and 2), which includes a suitable high vacuum amplifying tube 62 having at least an anode 63, a control grid 64, and a cathode 65, which amplifier stage also includes a grid resistor 66, a cathode resistor 67, an input capacitor 58, and a cathode by-pass condenser 68. The anode 63 of each such amplifier tube 62 is supplied with plate voltage by the lead 69 through the anode resistor 70, the other end of lead 69 being connected to a terminal 71 on voltage divider 7 adapted to supply suitable amplifier plate potential. A terminal 60a on the control grid resistor 66 has the same potential as the impulse input terminal 60 and the cathode resistor terminal 60b, the latter being connected by the series resistor 48 and line 49 to the negative terminal 53 on the voltage divider 7. The amplifier terminal 60a is connected by the counting bus line 52 to the screen grids 23 of the gaseous discharge tubes 20 in each counter bank 5 and 6, the screen grid for the first stage 10 in each bank being adapted to be connected to the line 52 through a starting switch 78. Hence, the first or "0" stage in the tube banks 5, 6 may be made conducting by first opening and then closing the associated starting switches 78. Thereafter, as the digitation pulse amplifying tubes 62 are caused to operate by the application of the suitable signal voltage to the input terminals 59, 60 thereof, in the manner previously described, the counter tubes 20 in each decade bank 5, 6 register the number of pulses received.

As mentioned earlier herein, the impulse generating means is connected to the input terminals 59, 60 and is adapted to supply digitation pulses to each ordinal tube bank, and preferably is also adapted to supply a timed transfer pulse which is applied to the input terminals 80, 81 of a transfer circuit. Such a circuit preferably includes a transfer control tube 83, such as a tetrode of the thyratron type commonly known as 2050, and a sharp cutoff transfer generating tube 84 (Fig. 1) of the high vacuum type having at least an anode 85, a control grid 86, and a cathode 87. The transfer control tube 83 is normally nonconducting, and has a control grid 89 connected by the line 91 to a terminal 88 on the lead 46 which connects the cathode circuit of the stage 19 or last counter tube with the stage 10 control grid 24 in the units order bank. Consequently, as stage 19 in the units bank 5 becomes conducting to indicate a value of "9," it applies sufficient bias to control grid 89 to render the gate or control tube 83 conducting upon reception of the next signal pulse, the screen grid 90 of tube 83 being connected at the point 82 (Fig. 1) to the common screen grid pulsing line 52 of tube bank 5. Hence, if any tube except the "9" tube or last stage tube 20 in bank 5 is conducting, the gate or transfer control tube 83 will not fire up_n reception of a signal impulse. However, if the last such stage 19 is conducting, the control tube 83 will conduct upon reception of a signal impulse, at which time the "9" value stage 19 in bank 5 will cease to conduct and the first or "0" value stage 10 therein will again fire. Conduction by the control tube 83 primes, or conditions, the transfer operation until such time as the transfer pulse produced by the pulse generating means is impressed on the terminals 80, 81. These transfer pulses which are applied to the terminals 80, 81 do not occur simultaneously for each bank, but are staggered in a predetermined timed progression so that a transfer pulse would first be supplied to the units order transfer terminals 80, 81 and thereafter progressively to the transfer circuit of bank 6 and the tube banks for the higher orders, not shown. As mentioned earlier herein, a magnetic drum of the type shown and described in George W. Hopkins Patent No. 2,608,346 issued August 26, 1952, may be utilized to supply the digitation pulses to the terminals 59, 60 during the earlier portion of each revolution of the magnetic drum, and later to supply a series of timed transfer pulses to the input terminals 80, 81.

Thyratron transfer control tube 83 has positive plate voltage supplied to its anode 92 through the anode resistor 94 and a line 95 connected to a suitable source of positive potential, not shown, the cathode 96 of tube 83 being connected at the point 97 to the transfer input line 80 and to one side of a cathode resistor 98 having its other terminal connected at 51 to ground. The anode 85 of the transfer generating tube 84 is also supplied with positive plate voltage by line 95 through the series resistors 99 and 100, the cathode 87 of which transfer tube is connected by line 101 to a suitable terminal 102 on voltage divider 7 adapted to normally bias tube 84 below cutoff. Transfer generating tube 84 normally has a high negative bias upon its grid 86 so that no plate current flows, but whenever the gate or control tube 83 becomes conducting, the passage of current through its cathode resistor 98 lowers the negative bias applied to grid 86 of tube 84 until this tube is just ready to conduct. Hence, whenever a transfer pulse is thereafter applied to the input terminals 80, 81, the control grid 86 of transfer generating tube 84 is driven positive and a sharp pulse of plate current flows. This plate current pulse is transferred by the series condensers 105, 106 and the lines 107, 108 to the control grid 64 of the amplifier tube 62 which controls the operation of the tens-order decade ring or counter bank 6 shown in Fig. 2, the sharp impulse of which amplifier tube 62 causes the tens-order bank 6 to read one digit higher.

Transfer impulses are supplied intermittently by the terminals 80, 81 to the transfer generating tube 84 (Fig. 1), but this tube does not pass these transfer impulses on the next ordinal bank unless the units order decade bank shown in Fig. 1 has counted a value of "10." Whenever transfer generating tube 84 passes current under control of the gate tube 83, tube 84 develops a voltage across resistor 99 which is in opposition to the charge already existing on a commutating condenser 110 caused by conduction of tube 83. The resulting discharge of the commutating condenser 110 lowers the anode voltage on the transfer control tube 83 so as to terminate conduction and restore this tube to its normally nonconducting condition before the next transfer impulse is received. Thus, the action of the commutating condenser 110 is similar to that of the interstage condensers 35 which connect the adjacent tube anodes in the tube banks 5 and 6, which banks include the cascade-connected gaseous discharge tubes 20 and the value indicating glow tubes 30 associated therewith.

We claim:

1. An electronic ring counter system having a plurality of stages and a plurality of banks of stages, a two-condition conducting circuit in each stage, a cathode, an anode, a control grid and a screen grid in each stage and forming parts of said two-condition circuit, a counting bus line connected to said screen grids in said stages for initiating functional changes in the condition of each such stage conducting circuit; a transfer control tube for a bank of stages, a cathode, an anode, a control grid and a screen grid in said control tube, said control grid in said transfer control tube being electrically connected to a stage conducting circuit, said screen grid in said transfer control tube being connected to said bus line, whereby joint functioning of said stage conducting circuit and bus line will cause functioning of said transfer control tube; a transfer generating tube in circuit connection with said transfer control tube, a control grid in said transfer generating tube, a transfer pulse circuit including said transfer control tube and said transfer generating tube; a condenser connected across the anodes of said transfer control tube and said transfer generating tube to extinguish said transfer control tube when said transfer generating tube operates, an amplifier system in circuit connection with said transfer control tube and said transfer generating tube and in circuit connection with one of the stages of the electronic ring counter system, said transfer control tube and said transfer generating tube being cooperable to control the sending of an extra pulse to said electronic ring counter system when it is necessary to count from one bank into another.

2. The combination set forth in claim 1; and a resistor in circuit connection with said condenser and cooperating with said condenser to extinguish said transfer control tube upon functioning of said transfer generating tube.

3. In an electronic ring counter having a plurality of banks of sequentially actuated stage conducting circuits, a stage control for each stage conducting circuit, and a counting bus line for impressing counting pulses on the controls for such stage conducting circuits for obtaining sequential functioning thereof, the combination, comprising, a transfer control tube, an anode in said transfer control tube, a control grid in said transfer control tube connected to one of said stage conducting circuits in one of the banks, a screen grid in said transfer control tube connected to said counting bus line whereby joint functioning of said one stage conducting circuit and said counting bus line will cause functioning of said transfer control tube, a transfer generating tube, an anode in said transfer generating tube, a control grid in said transfer generating tube, a pulse circuit including said control grid in said transfer generating tube, a pulse transfer circuit extending from said transfer generating tube to another of the banks, so that joint functioning of said transfer control tube, said transfer generating tube and said pulse transfer circuit will cause a transfer pulse to be transmitted from a stage in one bank to a stage in another bank and a commutating condenser connected to the anodes of said transfer control tube and said transfer generating tube to extinguish said transfer control tube upon conduction in said transfer generating tube.

4. In an electronic ring counter having a plurality of banks of sequentially actuated stage conducting circuits, a stage control for each stage conducting circuit, and a counting bus line for impressing counting pulses on the controls for such stage conducting circuits for obtaining sequential functioning thereof, the combination, comprising, a normally non-conducting transfer control tube, a control grid in said transfer control tube connected to one of said stage conducting circuits, a screen grid in said transfer control tube connected to said counting bus line whereby joint functioning of said one stage conducting circuit and said counting bus line will cause conduction in said transfer control tube; a normally nonconducting transfer generating tube, a pulsing circuit extending to and including said transfer control tube and said transfer generating tube, pulse transfer circuit extending from said transfer control tube and said transfer generating tube in one bank to another bank and said transfer control tube and said transfer generating tube cooperating to send a transfer pulse over said pulse transfer circuit from a stage in one bank to a stage in another bank to carry the count of pulses from one bank to another when a pulse comes over said pulsing circuit and the last stage in one bank has operated and the counting must be continued in a succeeding bank, and a condenser and resistance in series connected across the anodes of said transfer control tube and said transfer generating tube to extinguish said transfer control tube when said transfer generating tube operates to send a pulse.

5. In an electronic ring counter having a plurality of banks of sequentially actuated stage conducting circuits, a stage control for each stage conducting circuit, and a counting bus line for impressing counting pulses on the controls for such stage conducting circuits for obtaining sequential functioning thereof, the combination, comprising, a transfer control tube, a control grid in said transfer control tube connected to one of said stage conducting circuits, a screen grid in said transfer control tube connected to said counting bus lines whereby joint functioning of said one stage conducting circuit and said counting bus line will cause functioning of said transfer control tube, a sharp-cutoff high-vacuum transfer generating tube, a pulsing circuit extending to and including said transfer control tube and said transfer generating tube, a pulse transfer circuit extending from said transfer control tube and said transfer generating tube and from one bank of the counter to another bank, and said transfer control tube and said transfer generating tube being cooperable to transfer an advancing pulse from a stage in one bank in said counter to another bank in said counter to carry the counting of pulses from one bank to a succeeding bank, and a condenser connected across the anodes of said transfer control tube and said transfer generating tube.

6. An electronic ring counter comprising a plurality of banks of sequentially actuated tetrodes arranged in cascade circuit connection and forming stage conducting circuits; a stage control for each stage conducting circuit, a counting bus line for impressing counting pulses on the screen grids for such stage conducting circuits for obtaining sequential functioning thereof, a normally non-conducting gaseous discharge transfer control tube in circuit connection with one of said banks, a control grid in said control tube connected to one of said stage conducting circuits, a screen grid in said control tube connected to said counting bus line whereby joint functioning of one of said stages and said counting bus line will cause functioning of said transfer control tube, a pulsing circuit; a sharp-cutoff high-vacuum transfer generating tube in circuit connection with said pulsing circuit and said transfer control tube, a pulse transmitting circuit extending from said transfer control tube and said transfer generating tube and from one of said banks to another to carry a signal pulse from one bank to another when the first bank has been operated to capacity, and a commutating condenser connected across the anodes of said transfer control tube and said transfer generating tube to extinguish said transfer control tube when said transfer generating tube is operated.

References Cited in the file of this patent

UNITED STATES PATENTS

| | | |
|---|---|---|
| 2,405,096 | Mumma | July 30, 1946 |
| 2,427,533 | Overbeck | Sept. 16, 1947 |
| 2,502,360 | Williams | Mar. 28, 1950 |
| 2,515,448 | Gulden | July 18, 1950 |
| 2,524,115 | Mumma | Oct. 3, 1950 |
| 2,536,955 | Palmer | Jan. 2, 1951 |
| 2,591,008 | Rench | Apr. 1, 1952 |
| 2,591,541 | Gulden | Apr. 1, 1952 |